(12) United States Patent
Aupetit et al.

(10) Patent No.: US 12,486,785 B2
(45) Date of Patent: Dec. 2, 2025

(54) ASSEMBLY FOR AN EXHAUST CONE IN A TURBOMACHINE NOZZLE

(71) Applicant: SAFRAN CERAMICS, Le Haillan (FR)

(72) Inventors: Christophe Paul Aupetit, Moissy-Cramayel (FR); Thierry Guy Xavier Tesson, Moissy-Cramayel (FR); Philippe Avenel, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/844,101

(22) PCT Filed: Mar. 8, 2023

(86) PCT No.: PCT/FR2023/050309
§ 371 (c)(1),
(2) Date: Sep. 5, 2024

(87) PCT Pub. No.: WO2023/175257
PCT Pub. Date: Sep. 21, 2023

(65) Prior Publication Data
US 2025/0188849 A1 Jun. 12, 2025

(30) Foreign Application Priority Data
Mar. 14, 2022 (FR) ...................... 2202232

(51) Int. Cl.
*F01D 25/00* (2006.01)
*F01D 25/24* (2006.01)

(52) U.S. Cl.
CPC ......... *F01D 25/005* (2013.01); *F01D 25/243* (2013.01); *F05D 2260/31* (2013.01); *F05D 2300/6033* (2013.01)

(58) Field of Classification Search
CPC ...... F01D 25/005; F01D 25/24; F01D 25/243; F01D 25/26; F05D 2260/31; F05D 2300/6033
See application file for complete search history.

(56) References Cited

U.S. PATENT DOCUMENTS

| | | | |
|---|---|---|---|
| 2012/0160933 A1 | 6/2012 | Vauchel et al. | |
| 2015/0226083 A1 | 8/2015 | Renggli et al. | |

(Continued)

FOREIGN PATENT DOCUMENTS

| | | | |
|---|---|---|---|
| FR | 2935753 A1 | 3/2010 | |
| FR | 3100575 A1 | 3/2021 | |

OTHER PUBLICATIONS

International Search Report in corresponding International Patent Application No. PCT/FR2023/050309 mailed Jun. 27, 2023, 2 pages, English translation only.

*Primary Examiner* — Elton K Wong
(74) *Attorney, Agent, or Firm* — Cozen O'Connor

(57) ABSTRACT

An assembly for a turbomachine optimizes air flow near the exhaust cone which has an outer annular wall for the flow of a primary air flow and an inner annular wall arranged inside the outer annular wall, a metal casing arranged upstream of the exhaust cone, a shroud defining a radially inner face with respect to the primary air flow, and a metal connecting flange interposed longitudinally between the inner annular wall and the metal casing and connecting the inner annular wall and said metal casing. The assembly includes at least one bolt which passes through the outer annular wall and the annular portion of the connecting flange, a nut screwed onto the bolt and arranged radially inside the annular portion of the connecting flange, and at least one spacer which has a coefficient of expansion that is greater than the coefficient of expansion of the metal casing.

14 Claims, 4 Drawing Sheets

(56) References Cited

U.S. PATENT DOCUMENTS

2016/0131083 A1\* 5/2016 Lu ............................ F02K 1/80
                                                      239/265.11
2016/0326911 A1\* 11/2016 Karafillis .................. F02C 7/20

\* cited by examiner

ASSEMBLY FOR AN EXHAUST CONE IN A TURBOMACHINE NOZZLE

CROSS-REFERENCE TO RELATED APPLICATIONS

This application is a US National phase Application of PCT/FR2023/050309 filed Mar. 8, 2023, which claims priority to French Patent Application No. 2202232 filed Mar. 14, 2022, both of which are hereby incorporated in their entirety.

TECHNICAL FIELD OF THE INVENTION

This document concerns the arrangement of an exhaust cone in a turbomachine nozzle, in particular the arrangement of an exhaust cone made of ceramic matrix composite (CMC).

BACKGROUND

This description concerns an assembly located at the rear of an aircraft turbojet, at the downstream end, for optimizing the flow of air expelled by the turbojet. More precisely, this description concerns the connection between what is often called the exhaust cone and, located just upstream of the exhaust cone, a casing of the turbojet, for example a gas outlet casing of the turbojet.

FIG. 1 represents an assembly for an aircraft turbojet, comprising a central gas ejection element which is annular around a longitudinal axis X and is adapted so that gas is ejected around it from upstream (AM) to downstream (AV), by the turbojet, said assembly being connected to a metal outlet of the turbojet. Said longitudinal axis X is the longitudinal axis or axis of rotation of the turbomachine, in particular of the fan 20 and the movable blades of the engine 12. The central gas ejection element may correspond to the exhaust cone, denoted 1 below, or at least to the upstream portion denoted 1a below.

The gas turbojet 10 of an aircraft comprises a central portion, forming the gas turbine engine 12, mounted within an engine nacelle assembly 14 as is typical of an aircraft designed for subsonic operation. The turbojet may in particular be a turbofan engine. The nacelle assembly 14 generally comprises an engine nacelle 16 and a fan nacelle 18 surrounding a fan 20 located axially upstream of engine 12.

Engine 12 comprises, axially in the downstream portion, at least one turbine which may be a low-pressure turbine, and, downstream of this turbine, a metal exhaust casing 22 comprising an inner annular shroud 22a and an outer annular shroud 22b defining between them a downstream portion of the primary annular flow path 24 in which the combustion gases coming from the combustion chamber of engine 12 circulate.

Inner annular shroud 22a is connected, at its downstream end, to exhaust cone 1, which may comprise an upstream portion 1a of substantially cylindrical shape and a downstream portion 1b of conical shape. Inner annular shroud 22a is aligned with the outer wall of exhaust cone 1 to form a homogeneous flow path for the air exiting engine 12.

The outer wall of the exhaust cone is generally made of ceramic matrix composite in order to withstand the temperatures of the gases exiting engine 12 and to reduce the overall mass of the turbojet.

However, it remains difficult to achieve an efficient aerodynamic connection between the aforementioned metal outlet of the turbojet, which may be said inner annular shroud 22a, and said central element, which may be upstream portion 1a of exhaust cone 1. Indeed, the difference in materials between exhaust casing 22 and exhaust cone 1 causes differential expansions of the outer wall of exhaust cone 1 relative to inner annular shroud 22a. During operation, the outer wall of exhaust cone 1 and the inner annular shroud 22a may assume an oval shape, generating a hydraulic jump between the outer wall of exhaust cone 1 and the inner annular shroud 22a. Consequently, the hot gases coming from the primary annular flow path 24, from the engine 12 side, rush into the exhaust cone instead of following the primary annular flow path 24 external to the outside wall. This phenomenon, called scooping, is detrimental to the resistance of the parts, in particular of the exhaust cone, because it generates additional forces and reduces the performance of engine 12 by disrupting the flow of the air flow.

There is a need for improvement in the assembly of the exhaust cone and exhaust casing.

SUMMARY OF THE INVENTION

This document proposes an assembly for a turbomachine having a longitudinal axis, comprising:
an exhaust cone comprising an outer annular wall for the flow of a primary air flow, made of a ceramic matrix composite material, and an inner annular wall arranged inside the outer annular wall,
a metal casing arranged upstream of the exhaust cone and comprising a shroud defining a radially inner face with respect to the primary air flow,
a metal connecting flange interposed longitudinally between the inner annular wall and the metal casing and connecting the inner annular wall to said metal casing,
wherein an upstream end of the outer annular wall is arranged in the aerodynamic extension of the shroud of the exhaust casing, and
wherein the outer annular wall is arranged with a radial annular clearance with an annular portion of the connecting flange,
the assembly further comprising at least one bolt which passes through the outer annular wall and the annular portion of the connecting flange, and a nut screwed onto said bolt and arranged radially inside the annular portion of the connecting flange,
the assembly further comprising at least one spacer held radially between the nut and a radially inner surface of the annular portion of the connecting flange, said spacer having a coefficient of expansion that is greater than the coefficient of expansion of the metal casing.

During operation, when the assembly is hot, the metal casing, in particular the shroud of the metal casing, and the connecting flange present radial expansions that are greater than the radial expansions of the outer annular wall. The coefficient of expansion of the spacer makes it possible to compensate radially for the differences in thermal expansion between the metal parts and the outer annular wall made of CMC, which ensures that contact is maintained between the underside of the bolt and the outer annular wall. This arrangement allows preventing the scooping phenomenon because the outer annular wall is maintained as an aerodynamic extension of the shroud of the exhaust casing. The spacer thus allows compensating for the thermal expansion differential and ensuring continuity in the stiffness of the assembly.

The coefficient of expansion of the spacer may be 20% to 30% higher than the coefficient of expansion of the metal casing.

Several bolts may be arranged for fixing the outer annular wall to the connecting flange. Preferably they may be distributed circumferentially on the connecting flange. For example, at least four bolts may fix the outer annular wall to the connecting flange. The bolts may be arranged at an upstream end portion of the outer annular wall. For example, the outer annular wall may be made of Inconel® nickel-based alloy 625 and the spacer may be made of A286 steel.

According to one embodiment, the assembly may comprise a spacer for each bolt. Each spacer may surround the corresponding bolt. The spacer may be integral with the nut screwed onto said bolt. Alternatively, the spacer may be a separate part from the nut, the nut being tightened against a radially inner end of said spacer. In this case, the spacer may be made of a different material than the material of the nut.

The spacer may be cylindrical, in particular tubular. The spacer may have a hollow conical shape for receiving the bolt, the largest base of the spacer abutting against the radially inner surface of the annular portion of the connecting flange.

The spacer may be made of steel, in particular A286 steel, or of any other iron-based alloy. According to one embodiment, the spacer may have a corrugated or sinusoidal shape. The spacer may comprise at least a first portion in contact with the radially inner surface of the annular portion of the connecting flange and at least a second portion traversed by the bolt, which is radially distant from the annular portion of the connecting flange and is connected to said at least a first portion. The nut may be tightened against a radially inner surface of said at least a second portion, said first portion being circumferentially distant from the bolt. The spacer may be made of steel, in particular A286 steel, or of any other iron-based alloy. For example, a space may be provided between the outer surface of the bolt and the inner surface of the hollow in the spacer, when the assembly is cold. For this purpose, the bolt may comprise recesses on its outer surface.

In particular, the assembly may comprise, for each bolt, an additional nut mounted on said bolt and tightened against a radially outer surface of said at least a second portion. This arrangement makes it possible to avoid deformation of the outer annular wall, radially inward towards the connecting flange.

The spacer may be annular, i.e. may extend over the entire circumference of the annular portion of the connecting flange. The spacer may be one piece or may be formed by several annular sectors. Alternatively, the spacer may extend over an annular sector, for example over an eighth or a quarter of a circle. The spacer may comprise several second portions each receiving a bolt. The spacer may then comprise a first portion arranged between each pair of consecutive second portions.

According to one embodiment, the outer annular wall may be formed by at least two adjacent annular sectors, said assembly comprising at least one connecting wall joining two adjacent annular sectors. Said connecting wall may be interposed radially between the outer annular wall and the connecting flange. The connecting wall may be annular or extend over an angular sector, for example an eighth of a circle. The connecting wall may be made of ceramic matrix composite. The connecting wall makes it possible to stiffen the outer annular wall.

The connecting wall may be fixed to the outer annular wall by the bolt which fixes the outer annular wall to the connecting flange. A connecting nut may be screwed onto said bolt and tightened against a radially inner surface of the connecting wall. The nut may be coupled to an additional spacer traversed by the bolt and interposed radially between the connecting wall and said connecting nut. The additional spacer may be cylindrical or have a hollow conical shape to receive the bolt, the largest base of the spacer abutting against the radially inner surface of the connecting wall. The additional spacer may be made of steel, in particular A286 steel, or of any other iron-based alloy. In this case, the annular portion of the connecting flange may have orifices each configured to receive both the bolt and the additional spacer.

The upstream end of the outer annular wall may be aligned longitudinally with the upstream end of the annular portion of the connecting flange.

The outer annular wall may comprise at least one orifice receiving one of the bolts, said orifice having a greater diameter than the diameter of said bolt.

Said at least one bolt may comprise a head arranged in simple contact with the radially outer surface of the outer annular wall when the assembly is cold.

The inner annular wall may be made of CMC or of metal. The bolts may be of metal, for example made of the same material as the connecting flange and/or the shroud of the metal casing.

The assembly can be considered to be cold when it is at a temperature below 100° C. and can be considered hot when it is at a temperature above 500° C., for example between 500° C. and 700° C.

This document also relates to a turbomachine or a turbojet, for example of an aircraft, comprising an assembly as mentioned above.

DETAILED DESCRIPTION OF THE INVENTION

Figure 1:
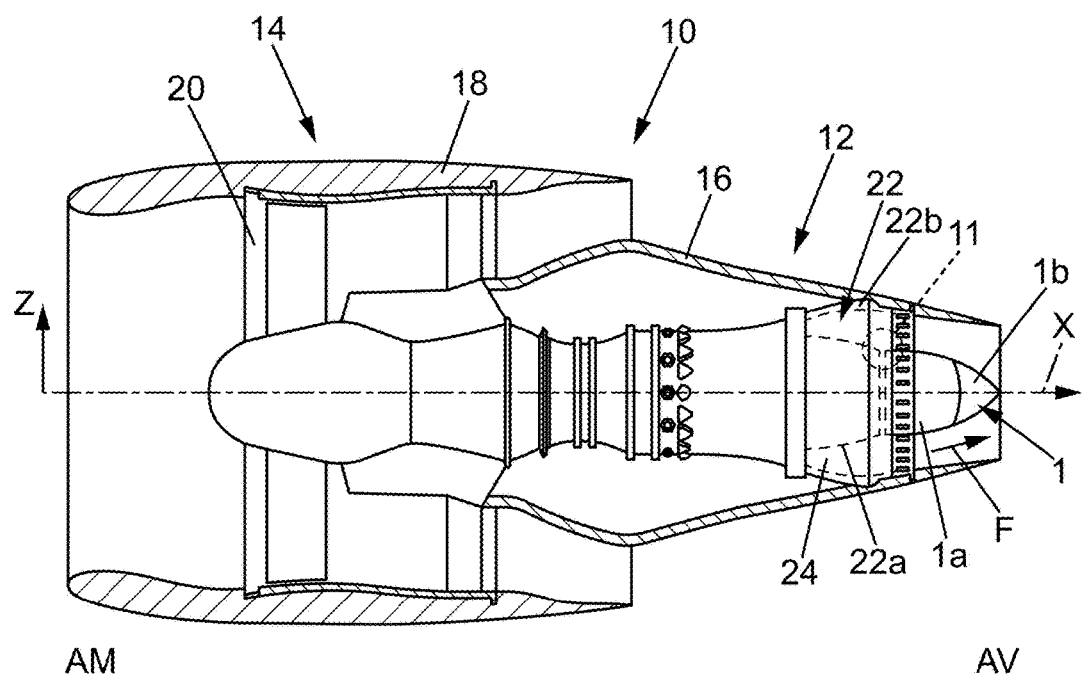
FIG. 1 represents a radial section view of a turbomachine according to the prior art.
Figure 2:
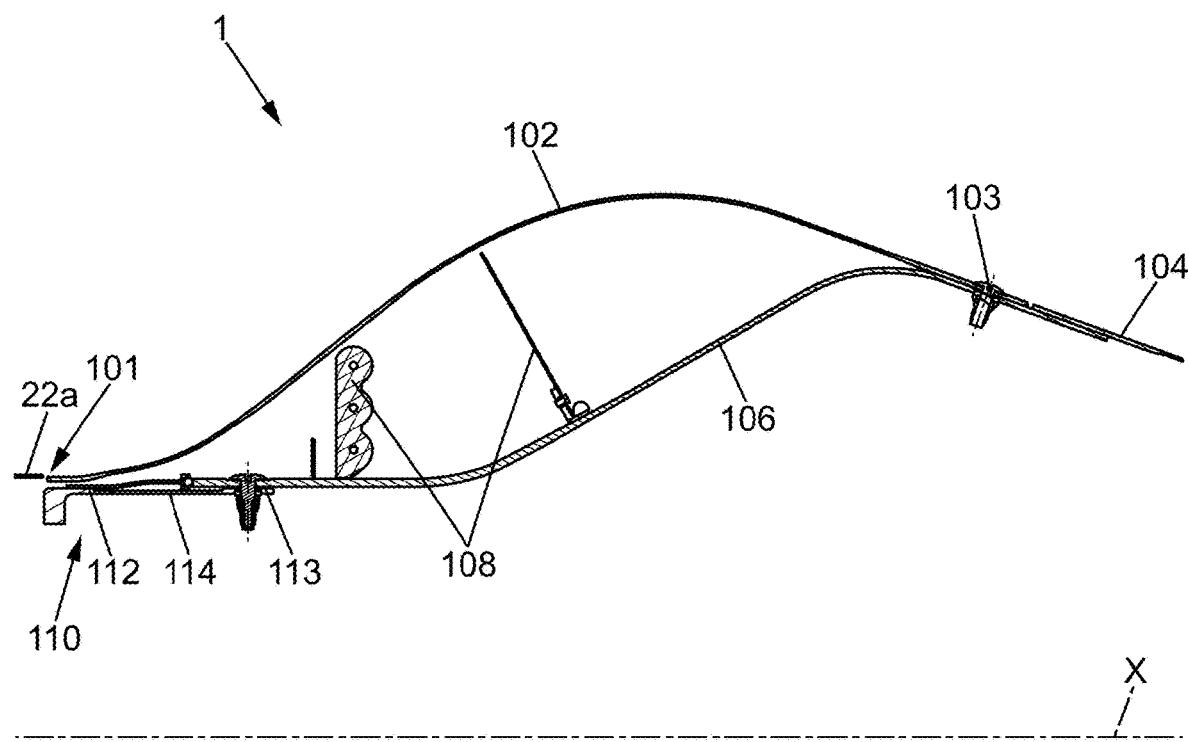
FIG. 2 represents a radial section view of an enlargement of the area where the exhaust cone of the turbomachine of FIG. 1 is connected to the exhaust casing.
Figure 3:
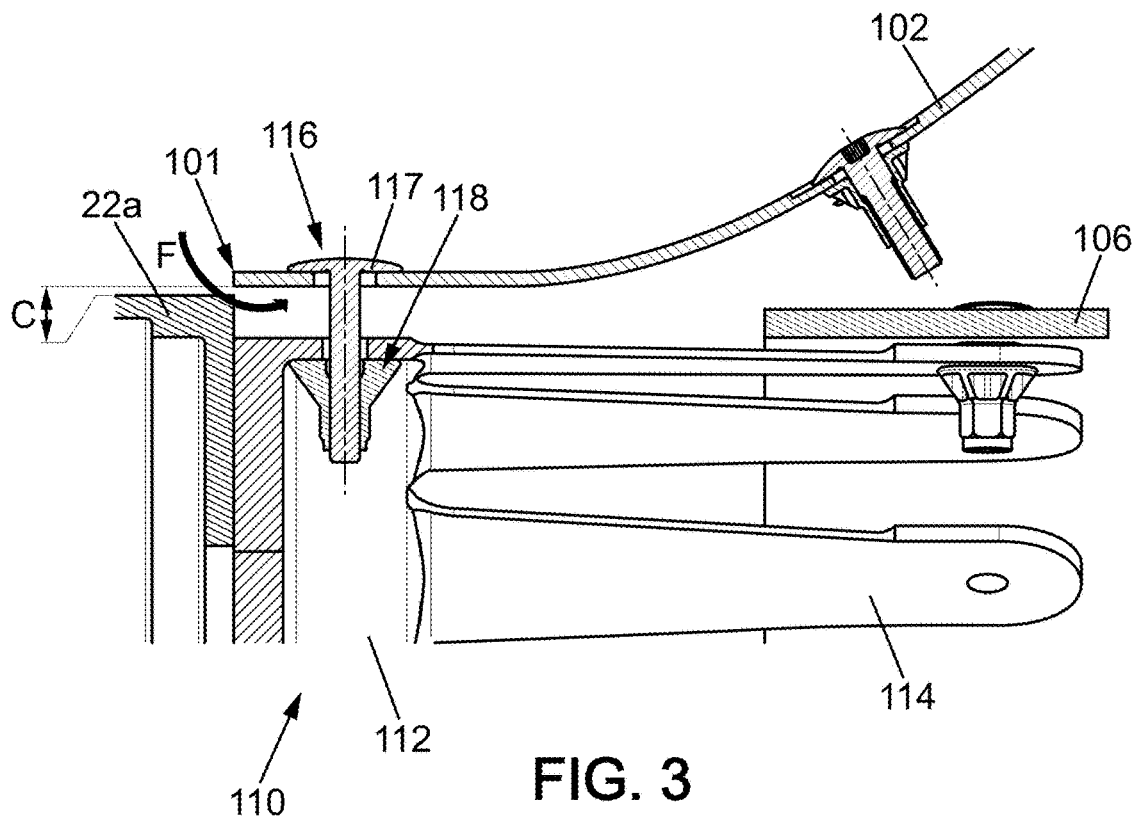
FIG. 3 represents an enlarged radial section view of the assembly of the exhaust cone of the turbomachine of FIG. 1 to the exhaust casing, during operation of the turbomachine.

FIG. 2 represents an enlargement of region 11 of FIG. 1 and FIG. 3 is a truncated view of this enlargement when the parts of the turbomachine are hot. The assembly is considered cold when it is at a temperature below 100° C. and can be considered hot when it is at a temperature above 500° C., for example between 500° C. and 700° C.

Exhaust cone 1 comprises an outer annular wall 102 around the longitudinal axis X and arranged upstream, and a conical wall arranged downstream according to the flow of the hot gases F. Outer annular wall 102 surrounds an inner annular wall 106 which is fixed, downstream, to outer annular wall 102 by fixing screws 103. Partitions 108 are arranged in the space between outer annular wall 102 and inner annular wall 106 so as to form a plurality of sound attenuation chambers. Partitions 108 extend perpendicularly to inner annular wall 106. Upstream, inner annular wall 106 is also fixed to shroud 22a of exhaust casing 22 by means of a connecting flange 110. Connecting flange 110 comprises an annular portion 112 upstream and a plurality of attachment lugs 114 extending longitudinally downstream from annular portion 112. Attachment lugs 114 may be flexible. Each attachment lug 114 is fixed by bolting 113 to inner annular wall 106. Upstream end 101 of outer annular wall 102 is in line with shroud 22a of the exhaust casing in order to define the flow path 24 for the hot gases exiting engine 12 of the turbomachine.

Outer annular wall 102 is made of ceramic matrix composite (CMC) material, in order to withstand the high temperatures of the hot gases while reducing the overall mass of the turbomachine. Inner annular wall 106 may be made of metal or of CMC. Shroud 22a of exhaust casing 22 and connecting flange 110 are generally made of metal.

To prevent radially outward displacement of outer annular wall 102, an upstream portion of outer annular wall 102 is fixed by bolt 116 and nut 118 to annular portion 112 of connecting flange 110. Head 117 of the bolt rests against the radially outer surface of outer annular wall 102. Nut 118 is tightened against the radially inner surface of annular portion 112 of connecting flange 110. The bolt and the nut are generally made of metal.

As shown in FIG. 3, during operation of the turbomachine, the parts of exhaust cone 1 are subjected to the high temperatures of the hot gases exiting engine 12. This causes an expansion of the metal parts, i.e. of shroud 22a of exhaust casing 22 and the connecting flange 110, which is greater than the expansion of outer annular wall 102, creating a radial offset forming a space C between end 101 and shroud 22a. Some of the flow of hot gases F may travel through space C to between outer annular wall 102 and inner annular wall 106. This can damage the parts of the exhaust cone.

Figure 4:
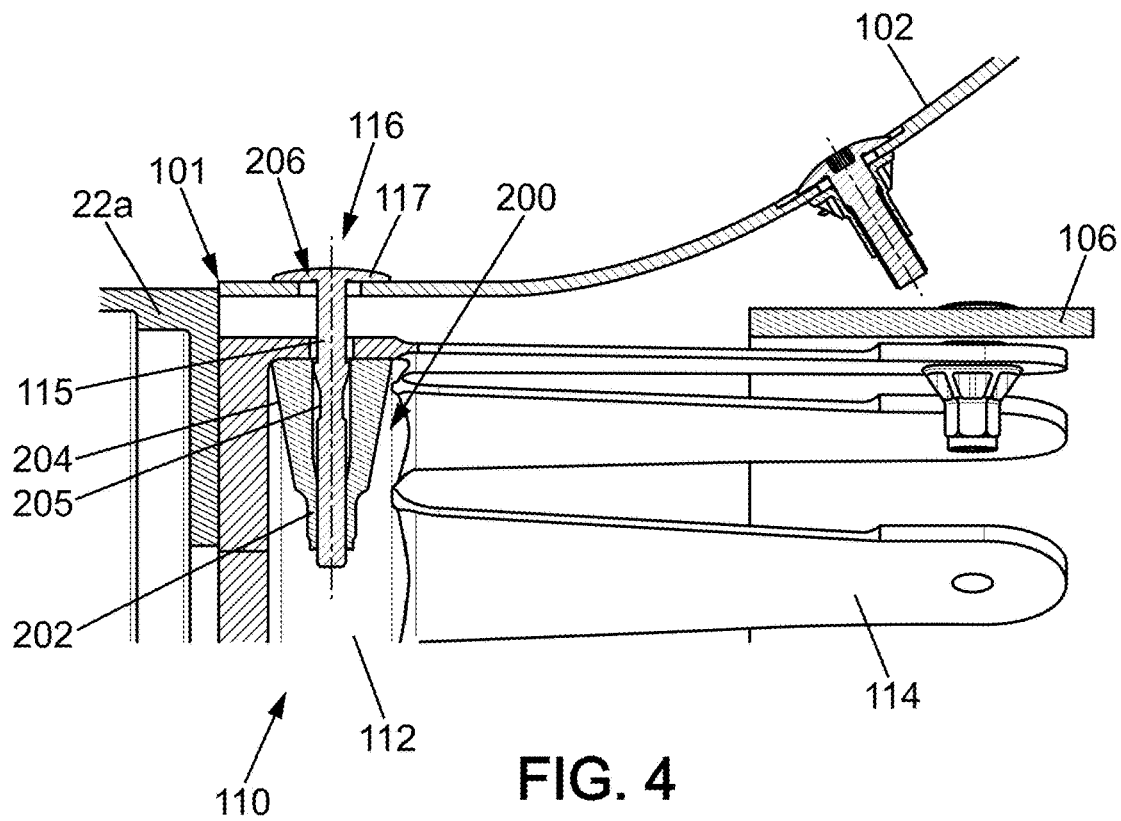
FIG. 4 represents a radial section view of the exhaust cone assembly according to a first embodiment of this document, when the turbomachine is cold.
Figure 5:
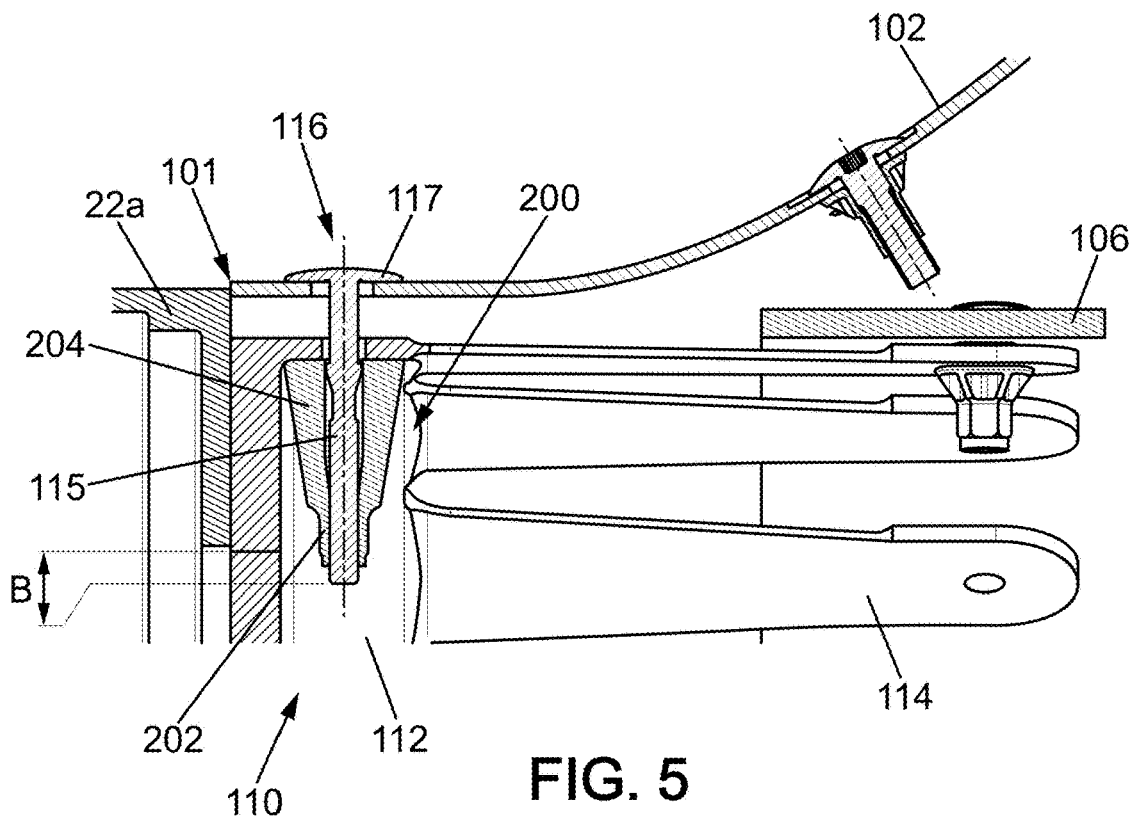
FIG. 5 represents a radial section view of the exhaust cone assembly according to the first embodiment of FIG. 4, when the turbomachine is hot and in a first operating configuration.
Figure 6:
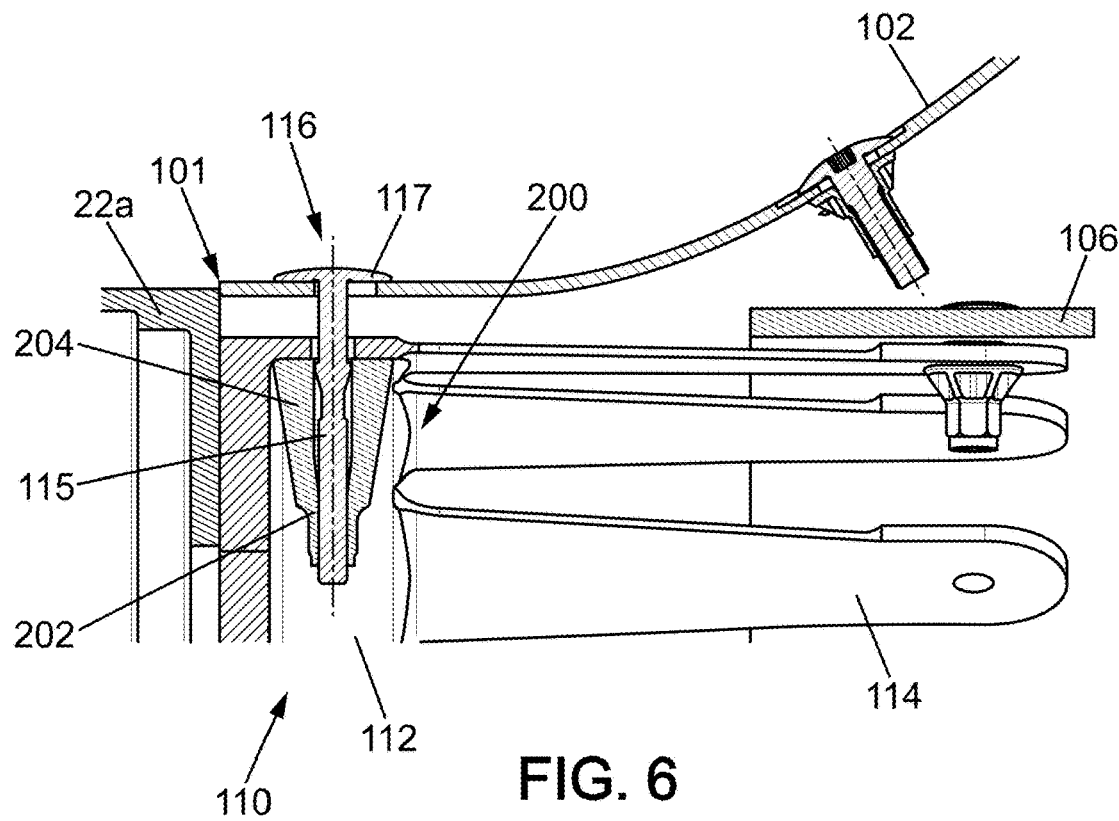
FIG. 6 represents a radial section view of the exhaust cone assembly according to the first embodiment of FIG. 4, when the turbomachine is hot and in a second operating configuration.

To limit or even eliminate this phenomenon, according to the invention at least one spacer 200 is provided in order to compensate for the expansion differential between the metal parts and outer annular wall 102 made of CMC (see FIGS. 4 to 6). Spacer 200 comprises a threaded portion 202 screwed onto the shank 115 of bolt 116 and a conical portion 204 traversed by shank 115 of bolt 116. Conical portion 204 is arranged between threaded portion 202 and annular portion 112 of connecting flange 110. In this embodiment, threaded portion 202, forming a nut, is integral with conical portion 204. Alternatively, threaded portion 202 may be separate from conical portion 204, and mounted tightly on shank 115 to abut against conical portion 204. In this case, threaded portion 202 may be made of a different material than conical portion 204. Instead of conical portion 204, spacer 200 may have a cylindrical portion, in particular tubular.

A recess 205 is provided at shank 115, providing a space between the inner surface of the hollow in conical portion 204 and the outer surface of shank 115. This space allows the expansion of spacer 200.

Spacer 200 has a greater coefficient of expansion, for example at least 20% to 30% greater, than the coefficient of expansion of shroud 22a of exhaust casing 22. This allows compensating for the differences in thermal expansion B when the assembly is hot.

Spacer 200 may be made of steel, in particular A286 steel. Its coefficient of expansion is then $17.7 \times 10^{-6} \text{ K}^{-1}$ at 500° C. As for exhaust cone 1, it may be made of an alloy primarily comprising nickel and chromium. It is for example made of Inconel® 625, for which the coefficient of expansion is $13.9 \times 110^{-6} \text{ K}^{-1}$ at 500° C.

In addition, outer annular wall 102 comprises orifices 206 each receiving shank 115 of bolt 116. Orifice 206 has a diameter greater than the diameter of shank 115. This allows axial movement of bolt 116 relative to outer annular wall 102 when connecting flange 110 and exhaust casing 22 expand more than outer annular wall 102 along the longitudinal axis X, as shown in FIG. 6.

Figure 7:
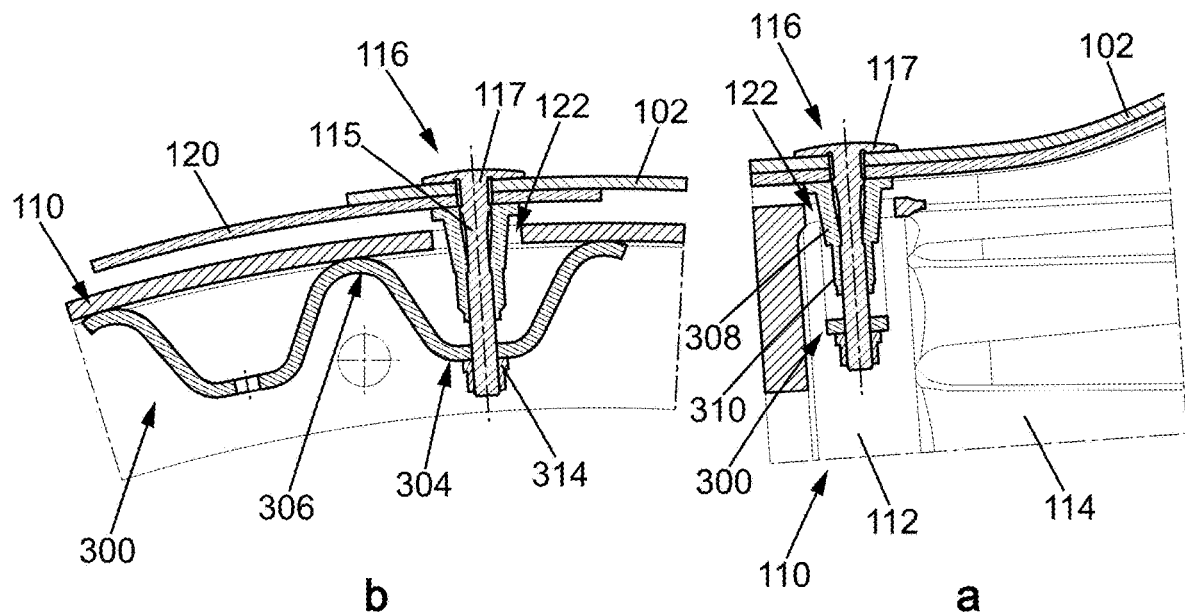
FIG. 7a represents a radial section view of the exhaust cone assembly according to a second embodiment of this document when the turbomachine is cold.
FIG. 7b represents a cross-section view of said assembly according to the second embodiment.

FIGS. 7a and 7b show a second embodiment of the exhaust cone. Unlike the exhaust cone of FIGS. 4 to 6, a spacer 300 having a corrugated shape and extending circumferentially is arranged against the radially inner surface of annular portion 112 of connecting flange 110. Spacer 300 comprises first portions 306 in contact with the radially inner surface of annular portion 112 of connecting flange 110. Spacer 300 comprises second portions 304 traversed by bolts 116, each second portion arranged between two successive first portions 306. Second portions 304 are radially distant from first portions 306. A nut 314 is screwed onto shank 115 and is tightened against the radially inner surface of second portion 304.

In the same manner as spacer 200, spacer 300 has a greater coefficient of expansion, in particular at least 20% to 30% greater, than the coefficient of expansion of shroud 22a of exhaust casing 22. This allows compensating for differences in thermal expansion when the assembly is hot.

Spacer 300 may be made of steel, in particular A286 steel.

Outer annular wall 102 is formed by several adjacent annular sectors interconnected by a connecting wall 120, for example made of CMC.

Connecting wall 120 is interposed radially between outer annular wall 102 and connecting flange 110 and is fixed to outer annular wall 102. Connecting wall 120 may be annular or may extend over an angular sector, for example an eighth of a circle, straddling two successive annular sectors of outer annular wall 102.

Connecting wall 120 is fixed to outer annular wall 102 by bolt 116. A connecting nut 310 is screwed onto shank 115 of bolt 116 and is tightened against a radially inner surface of connecting wall 120. Connecting nut 310 is integral with an additional spacer 308 traversed by shank 115 and interposed radially between connecting wall 120 and connecting nut 310. Additional spacer 308 is conical but may be cylindrical, for example tubular. Additional spacer 308 may be made of the same material as spacer 300 or of any other suitable material. Annular portion 112 of connecting flange 110 has orifices 122 having a diameter greater than the diameter of additional spacer 308 and of nut 310.

FIG. 7b shows a single first angular sector of outer annular wall 102 in the left part of the image. Of course, when a second angular sector of outer annular wall 102 is present, another bolt 116 may be inserted into outer annular wall 102, connecting wall 120, and second portion 304 of spacer 300.

Figure 8:
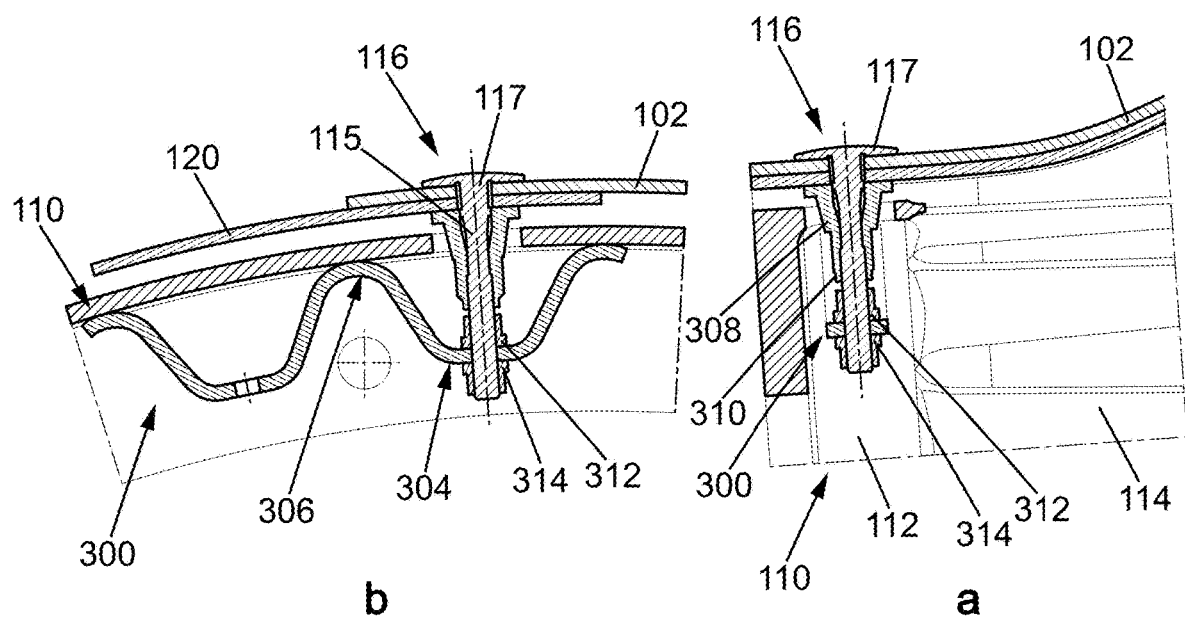
FIG. 8a represents a radial section view of the exhaust cone assembly according to a third embodiment of this document when the turbomachine is cold.
FIG. 8b represents a cross-section view of said assembly according to the third embodiment.

In order to limit the radially inward movement of outer annular wall 102, an additional nut 312 is screwed onto shank 115 and tightened against the radially outer surface of second portion 304, as shown in FIGS. 8a and 8b. Thus, additional nut 312 is arranged in opposition to nut 314.

The invention claimed is:

1. Assembly for a turbomachine having a longitudinal axis (X), comprising:
    an exhaust cone (1) comprising an outer annular wall (102) for the flow of a primary air flow (F), made of a ceramic matrix composite material, and an inner annular wall (106) arranged inside the outer annular wall,
    a metal casing (22) arranged upstream of the exhaust cone and comprising a shroud (22a) defining a radially inner face with respect to the primary air flow,
    a metal connecting flange (110) interposed longitudinally between the inner annular wall (106) and the metal casing (22) and connecting the inner annular wall to said metal casing,
    wherein an upstream end (101) of the outer annular wall is arranged in an aerodynamic extension of the shroud (22a) of the metal casing, and
    wherein the outer annular wall (102) is arranged with a radial annular clearance with an annular portion (112) of the connecting flange (110),
    the assembly further comprising at least one bolt (116) which passes through the outer annular wall (102) and the annular portion (112) of the connecting flange (110), and a nut (202,314) screwed onto said bolt and arranged radially inside the annular portion of the connecting flange,
    the assembly further comprising at least one spacer (204, 300) held radially between the nut and a radially inner surface of the annular portion of the connecting flange, said spacer (204,300) having a coefficient of expansion that is greater than the coefficient of expansion of the metal casing (22).

2. An assembly according to claim 1, comprising a spacer (204) for each at least one bolt (116), and wherein each spacer surrounds the corresponding bolt and is integral with the nut (202) screwed onto said bolt.

3. An assembly according to claim 1, wherein the at least one spacer (300) has a corrugated shape and comprises at least a first portion (306) in contact with the radially inner surface of the annular portion (112) of the connecting flange (110) and at least a second portion (304) traversed by the at least one bolt (116), which is radially distant from the annular portion (112) of the connecting flange (110) and is connected to said at least a first portion (306), wherein the at least one nut (314) is tightened against a radially inner surface of said at least a second portion (304), said first portion being circumferentially distant from the at least one bolt.

4. An assembly according to claim 3, comprising, for each at least one bolt (116), an additional nut (312) mounted on said bolt and tightened against a radially outer surface of said at least a second portion (304).

5. An assembly according to claim 4, wherein the spacer (300) is annular.

6. An assembly according to claim 3, wherein the spacer (300) is annular.

7. An assembly according to claim 3, wherein the outer annular wall (102) is formed by at least two adjacent annular sectors, said assembly comprising at least one connecting wall (120) joining two adjacent annular sectors, said connecting wall (120) being interposed radially between the outer annular wall (102) and the connecting flange (110).

8. An assembly according to claim 3, wherein the upstream end (101) of the outer annular wall (102) is aligned longitudinally with an upstream end of the annular portion (112) of the connecting flange (110).

9. A turbomachine comprising an assembly according to claim 3.

10. An assembly according to claim 1, wherein the outer annular wall (102) is formed by at least two adjacent annular sectors, said assembly comprising at least one connecting wall (120) joining two adjacent annular sectors, said connecting wall (120) being interposed radially between the outer annular wall (102) and the connecting flange (110).

11. An assembly according to claim 1, wherein the upstream end (101) of the outer annular wall (102) is aligned longitudinally with an upstream end of the annular portion (112) of the connecting flange (110).

12. An assembly according to claim 1, wherein the outer annular wall (102) comprises at least one orifice (206) receiving one of the bolts (116), said orifice having a greater diameter than the diameter of said bolt.

13. An assembly according to claim 1, wherein said at least one bolt (116) comprises a head (117) arranged in simple contact with the radially outer surface of the outer annular wall (102) when the assembly is cold.

14. A turbomachine comprising an assembly according to claim 1.

* * * * *